Aug. 8, 1950  F. AAGAARD  2,517,820
FLUID-PRESSURE CONTROLLER
Filed Aug. 10, 1948  4 Sheets-Sheet 4
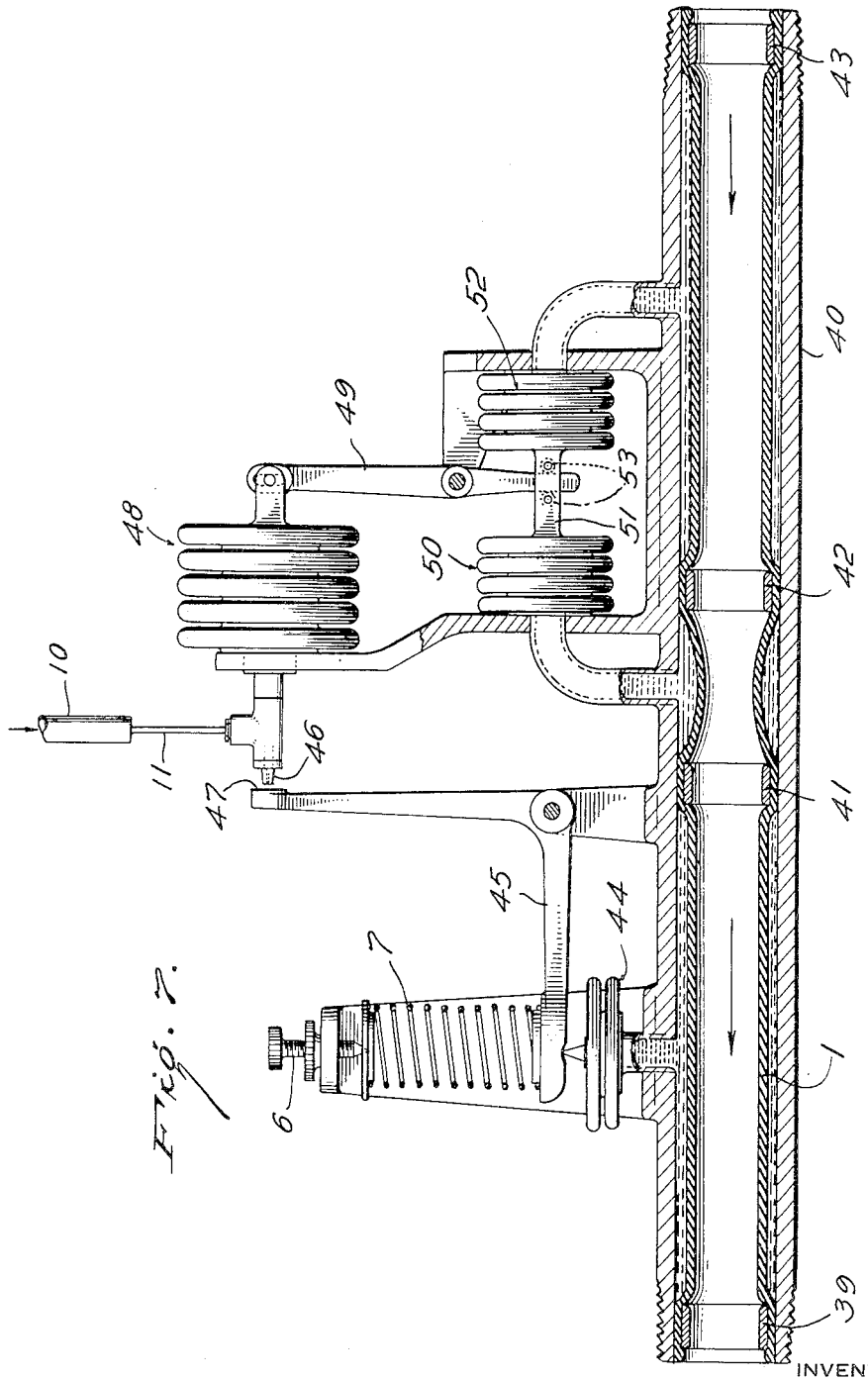
INVENTOR
FRIDTJOF AAGAARD,
BY
Robert Ames Norton
ATTORNEY Patented Aug. 8, 1950

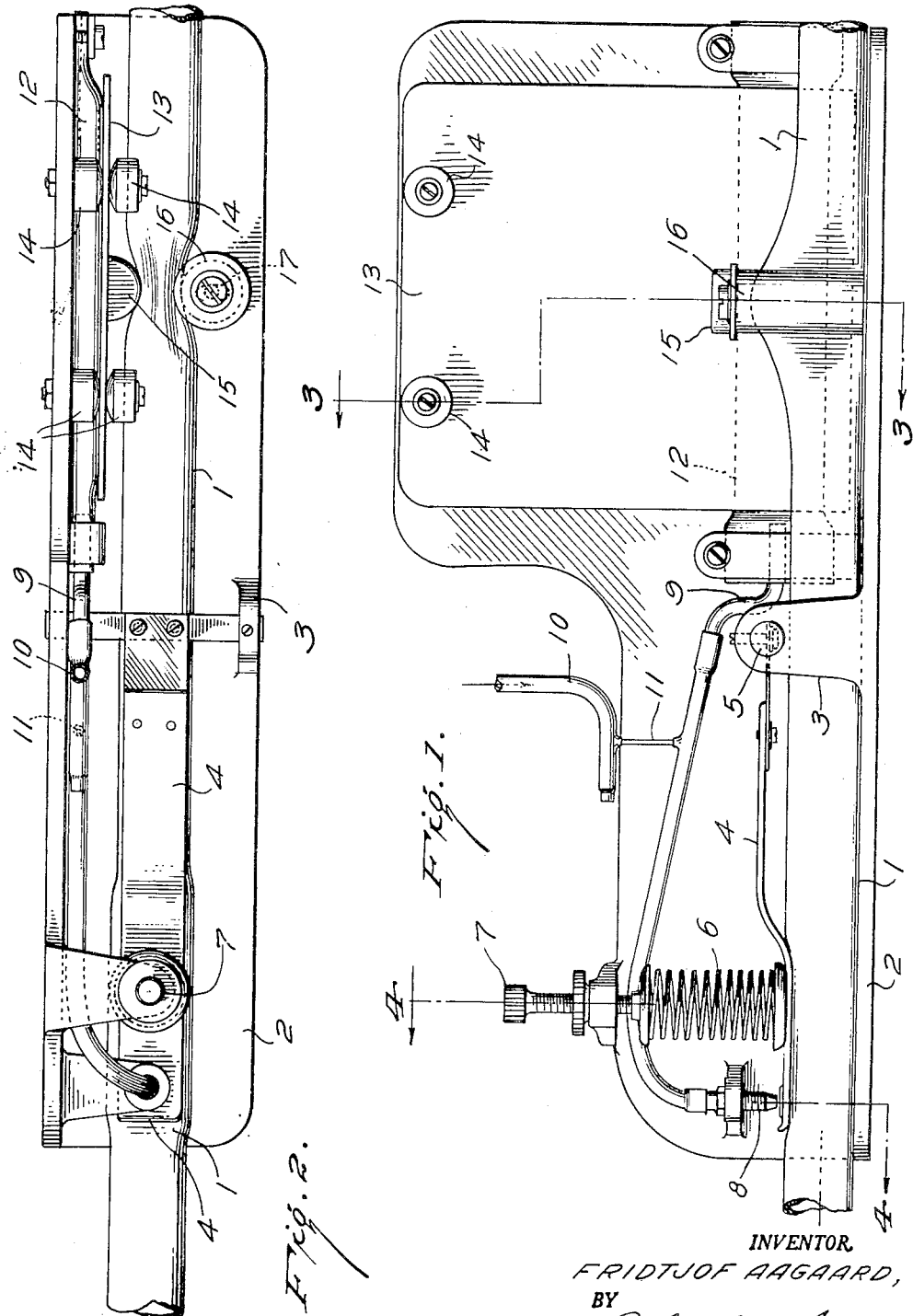

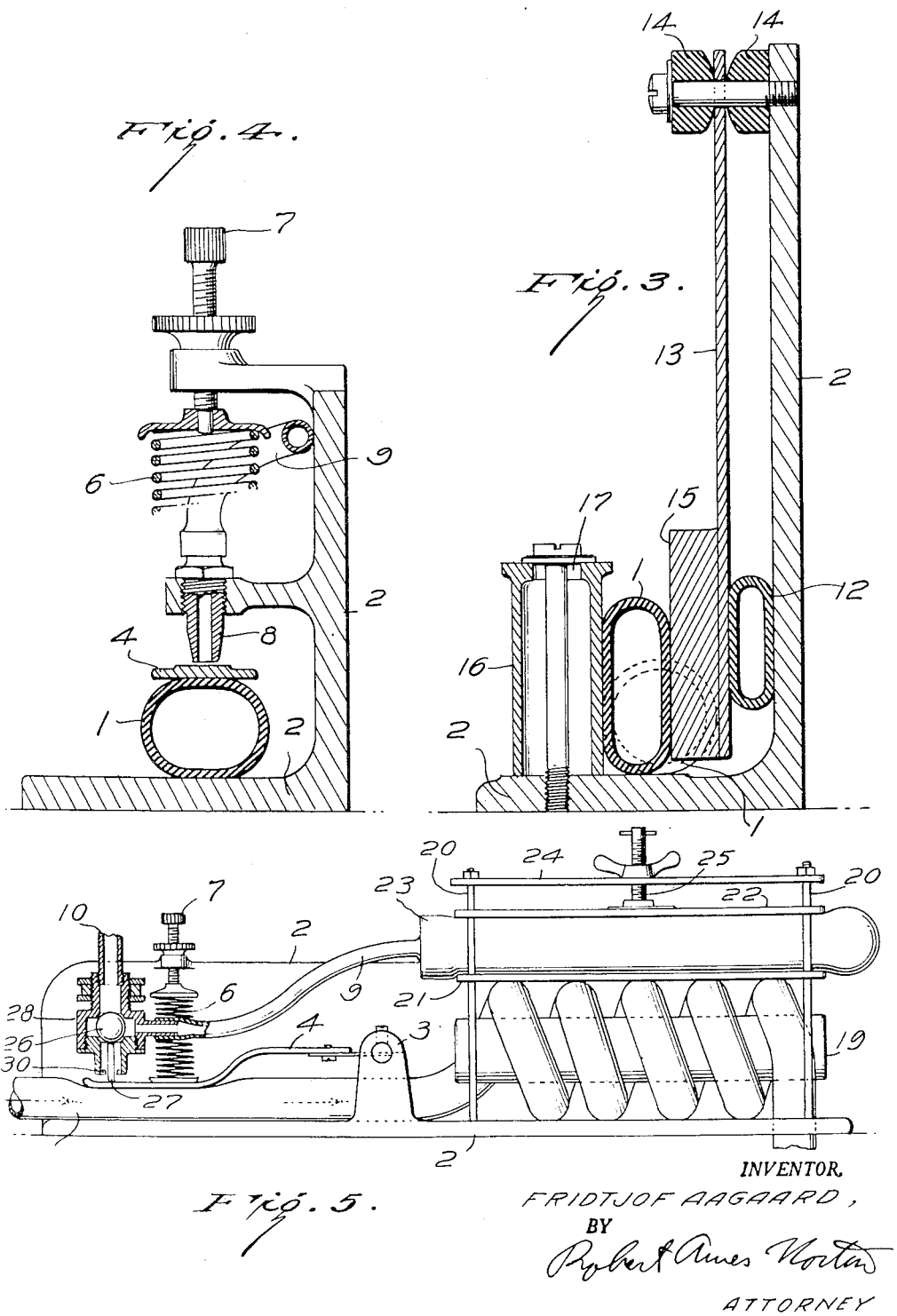

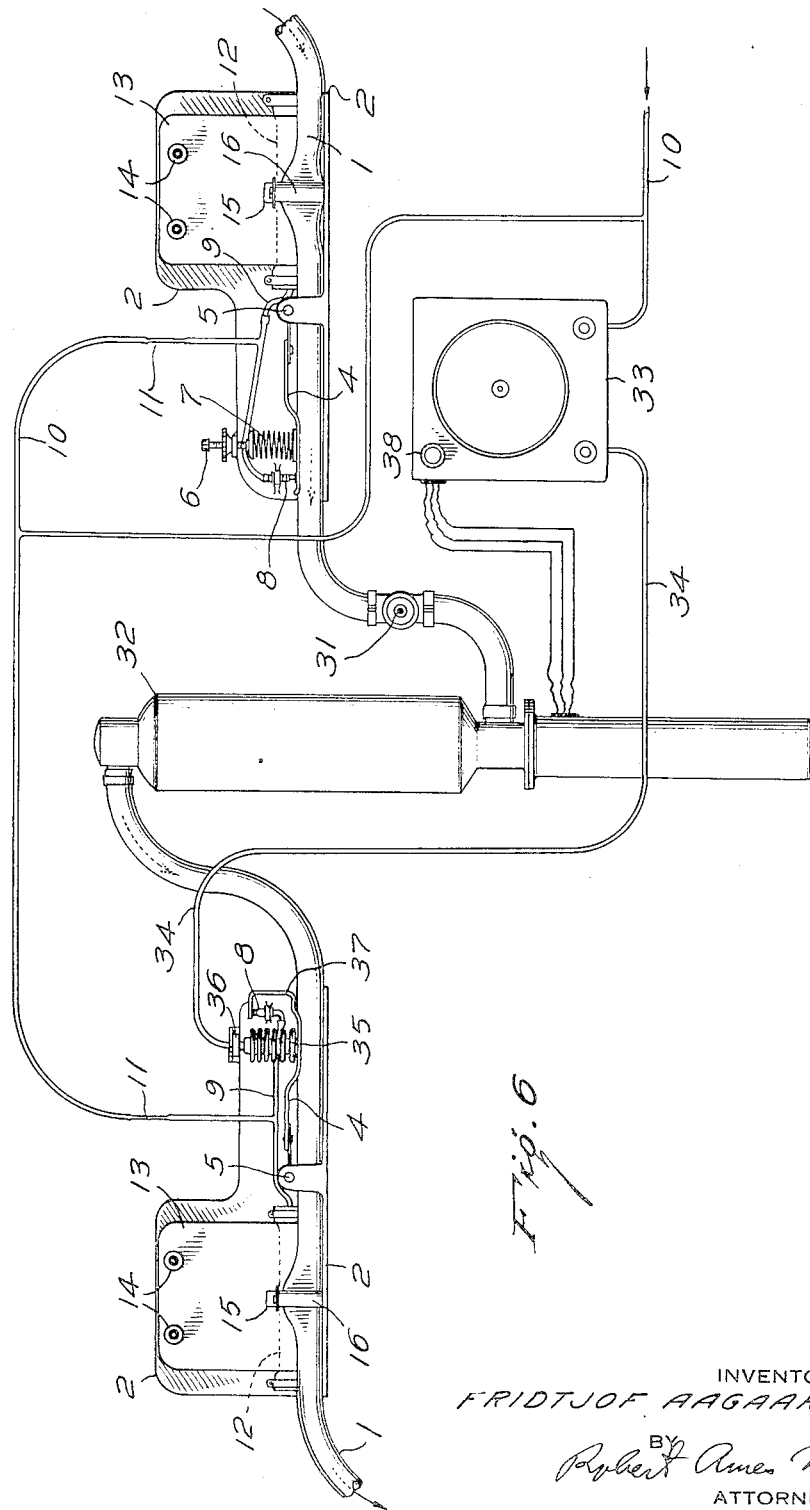

2,517,820

UNITED STATES PATENT OFFICE 2,517,820

FLUID-PRESSURE CONTROLLER

Fridtjof Aagaard, Rahway, N. J., assignor to American Cyanamid Company, New York, N. Y., a corporation of Maine Application August 10, 1948, Serial No. 43,366

6 Claims. (Cl. 50—11)

This invention relates to an improved device for measuring pressure of a flowing liquid in a conduit and more particularly to an improved fluid pressure controller.

The problem of keeping a constant pressure in a conduit in face of sharp pressure variations and flow demands presents a serious problem. The common self-operated reducing valve operates rapidly in adjusting itself to changes in unregulated fluid pressure at its output pressure, and at a given setting, will vary considerably with the rate of demanded flow. In order to obtain greater accuracy, in this respect, pilot operated valves are commonly resorted to. These will maintain a given pressure much more accurately but are inherently too slow in operation to provide rapid correction in face of sharp pressure variations. Another problem is presented where the fluid contains solids in suspension. In such a case clogging of main orifices or pilot systems is likely, with consequent failure to operate satisfactorily. Another difficulty arises when corrosive fluids are encountered. The ordinary type of throttling valve requires close tolerances and corrosion soon destroys its efficiency.

The present invention obviates many of the drawbacks hitherto encountered. Essentially, pressure is measured in a flexible, deformable conduit without requiring any opening into said conduit. The conduit is normally maintained in a partially deformed condition and any changes in shape due to pressure fluctuations in the liquid flowing in the conduit are used to actuate a fluid pilot valve, such as an air pilot. An extremely sensitive pressure measurement results and when a sensitive air pilot valve is used, fluctuations in pressure can be used to control the pressure by actuating a throttling device.

The air pilot may be of the spring loaded flapper valve and nozzle or other known types. Pilot air pressure is applied through mechanical or fluid transmission over a large surface which actuates a restricting device on the flexible tube through which the fluid flows. When hydraulic transmission is used, the large surface may be that of the flexible tube itself. The constriction may be either upstream or downstream from the air pilot valve depending on the desired pressure to be controlled. In each case, however, the relatively large surface exposed to the air pilot pressure results in a large multiplication of force which results in a reliable and powerful controlling action. Air or other compressed gas pilot valves have many advantages and are preferred but other fluid actuated controls where the control pressure is multiplied may also be used. In other words, compressed air is only one example of a suitable actuating fluid.

The use of flexible tubing permits a design in which neither corrosion nor clogging is a problem. Flexible tubes of suitable plastic material can be obtained which will resist almost any corrosive liquid and since there is no rigid throttling valve, clogging is not a problem in ordinary use. At the same time, the great multiplication of force from the air pilot or other control valve assures sensitive performance. Many air pilot valves can be designed that have a very low pneumatic capacitance and therefore a secondary relay is normally unnecessary. The fast action keeps the pressure controlled within a narrow range and such slight lag, as exists, is only sufficient effectively to prevent fluttering.

The freedom from clogging is important not only to make the operation more reliable but it also avoids any difficulty due to decomposition of solid particles which might be lodged in the ordinary type of valve. This is important where the fluid, the pressure of which is to be controlled, is an edible liquid which for sanitary reasons requires that the conduit be at all times clean and that there be no accumulation of solid particles which might decompose. This factor also permits ready cleaning of the flexible tube so that it can be used successively for different liquids without requiring dismantling or long cleaning time.

The invention will be described in greater detail in conjunction with the drawings in which:

Fig. 1 is a side elevation of the device of upstream controller;

Fig. 2 is a plan view thereof;

Fig. 3 is a vertical section along the lines 3—3 of Fig. 1;

Fig. 4 is a vertical section along the lines 4—4 of Fig. 1;

Fig. 5 is a side elevation of a downstream controller using a different type of air pilot and a different type of fluid control valve;

Fig. 6 is an elevation of a device using two pressure controllers, one upstream and one downstream, to effect a constant flow control; and, Fig. 7 is a side view, partly in section, of a modified upstream pressure controller suitable for controlling fluid pressures.

In the modification shown in Figs. 1–4, the fluid, such as a liquid, the pressure flow of which is to be controlled, flows through the flexible tube 1, passing through the framework 2 of the controller. A clamp 5 fastens a piece of thin spring steel to projections 3 of the framework. On the other end of the spring steel there is fastened a flapper 4 bearing on the upper surface of the tube 1. The construction of the flapper valve is shown most clearly in detail in Fig. 4. The valve is loaded by a spring 6, the pressure being adjusted by the threaded bolt 7, the adjustment being held in the conventional manner by a knurled locknut. A nozzle 8 which is threaded into a lug on the framework is positioned opposite a seat at the end of the flapper (Figs. 1 and 4).

Variations of pressure of the liquid in tube 1 will move the flapper 4 against the spring pressure and will vary the spacing of the nozzle 8 from the seat of the flapper 4. The nozzle is connected by a flexible tube 9 and a capillary tube 11 to a source of compressed air in a pipe 10. The other end of the flexible tube 9 is connected to a much larger flexible tube 12 which is compressed between a portion of the framework 2 and a movable plate 13 supported at its top between rubber blocks 14. The plate 13 carries on its opposite side at about the center a half round piece 15 which bears on the tube 1, compressing it against a round arbor 16 which is adjustable in a slot 17 (see Fig. 2). The interaction of tubes 1 and 12 and the plate 13 are shown particularly in Figs. 2 and 3.

In operation the position of the spring 6 and the position of the nozzle 8 are accurately adjusted so that when the desired pressure exists in tube 1, the flapper adjusts its spacing from nozzle 8. In this position, there is a steady flow of compressed air between the nozzle 8 and the flapper and the operation proceeds in a manner similar to other compressed air pilot relays. If the pressure in the tube 1 increases beyond the point for which the nozzle and spring load are set, the flapper is moved closer to the nozzle and the pressure above it increases. This pressure, acting within the tube 12, exerts a great force on plate 13, moving it in a direction to compress the tube 1 between the half round piece 15 and the arbor 16. This exerts a throttling action and the pressure balanced by spring 6 diminishes. The flapper then moves away from the nozzle 8 until an equilibrium is reached between the air flowing through the capillary 11 and out through the nozzle 8 at a new pressure in the tube 9. If the pressure in tube 1 falls too low, the flapper 4 moves away from the nozzle under pressure of the spring 6 and the flow of compressed air from the nozzle increases. This results in a drop in pressure in the tube 12. The plate 13 moves to the right as shown in Fig. 3 and the throttling effect of the tube 1 is decreased, resulting in increased flow and hence increased pressure on the flapper 4 until the latter is restored to the position at which the escape of compressed air through the nozzle 8 is just sufficient to maintain the necessary pressure in tube 12.

The speed of correction is determined by the dimensions of the capillary 11 and the position of the arbor 16. Moving the arbor 16 determines the effective working area of the tube 12 and hence the sensitiveness of the control. It is thus possible to adjust the device to almost any type of pressure control.

It will be noted that response to changes in pressure in tube 1 under the flapper valve gives prompt corrective action. There is less lag than has been necessary in the past. Correction of clogging is almost instantaneous because as the pressure drops in tube 1, the rapid drop of pressure in tube 12 reduces the restriction and clogging particles pass through immediately.

Another advantage of the modification described above is the wide range of pressure which can be controlled by the same spring. The position of the nozzle determines the degree to which the tube 1 is deformed by the flapper 4 during normal operation. The greater the deformation, the lower the pressure in tube 1 may be for a given spring tension. It is thus possible to use the same control elements over a wide range of pressures, and it is, of course, easy to substitute springs of different tension in order to extend the ranges still further.

A different modification is shown in Fig. 5, the same parts bearing the same reference numerals. The device, however, is shown as a downstream pressure controller instead of an upstream controller as shown in Figs. 1 to 4. In this modification instead of a straight section of tube 1, there is provided a helix 18 of deformable tubing wound around a mandril 19. The helix is slightly compressed between the framework 2 of the control valve and a movable plate 21 which slides on guides 20 attached to the framework. A second movable plate 22 also slides on the same guides and is positioned with respect to a tube plate 24 by the adjusting screw 25. Between the plates 21 and 22, there is positioned a shaped tube of deformable material closed at one end. This tube performs the same function as tube 12 in the foregoing figures. A spring loaded plate 4 rides on the tube 1 deforming the latter partially in normal position. The construction of the adjustable valve spring load is identical with that shown in Figs. 1 and 4. Instead of an air nozzle abutting against the plate 4 the stem 27 of a ball 26 rides thereon. This ball is located in a three way valve housing 28 which is threaded into a tapped support on the main framework of the valve and can be moved up or down. One of the openings to the valve chamber is connected to the compressed gas supply 10. A second opening is connected through the tube 9 to the deformable tube 23 and a third opening 30 through which the ball stem 27 projects is opened to the atmosphere.

In operation the normal setting of the plate 4 determined by the adjustment of the spring and the positioning of the valve housing 28 is such that the ball 26 is in an intermediate position and a portion of the supply of compressed gas is escaping through the opening 30. The pressure in the tube 23 is determined by the amount of gas escaping through the opening 30. If the pressure in tube 1 increases, the plate 4 moves up, decreasing the opening for the gas pressure supply 10 and increasing the opening 30, resulting in a drop in pressure in the tube 23. This permits the plate 21 to rise slightly and decreases constriction of the helix 18. As a result, flow through the helix is increased and the pressure in tube 1 falls until it has once more reached the pressure for which the spring 6 is set. The operation is therefore similar to that in Figs. 1-4.

The control valve shown in Fig. 5 is not quite as sensitive as that in Figs. 1-4 but can be used with greater supply pressures and can exert greater force on the control portion of the pressure regulator. The use of a helix permits a throttling effect without as great distortion of the flexible tube. As a result, the same throttling effect can be obtained with less danger of clogging and conversely where there are very large flows of liquid suspension containing abrasive materials, the wear is decreased because the distortion of each turn of the helix is so much smaller that the formation of turbulent eddies is minimized and the abrasive effect of sharp solid particles is thereby reduced.

Figs. 1–4 and Fig. 5 illustrate two types of fluid pilot valves and two types of throttling. Of course, the pilot of Fig. 5 can be used with the throttling device of Fig. 4 and vice versa.

Fig. 6 illustrates the use of two controllers, upstream and downstream with a variable restriction 31 between them, to control flow rather than pressure. The upstream controller is identical with that shown in Figs. 1–4 and bears the same reference numerals. This controller maintains inlet pressure to the restriction constant. If there were no changes in viscosity or other characteristics of the system, the downstream controller, which controls outlet pressure from the restriction, could be used to regulate flow through the restriction 31. However, flow will not necessarily remain constant with constant inlet and outlet pressure as there are changes in the viscosity of the fluid flowing, for example, by changes in temperature, content of solids and the like.

In the drawing of Fig. 6 a flow meter 32 is introduced downstream from the orifice 31, the meter being shown diagrammatically as the type which produces an electrical current varying with flow. This current actuates a compressed gas or other fluid controller 33 which is of conventional design and is provided with an adjusting knob 38. The controller is supplied from a source of compressed gas 10 which source also leads to the two controllers through the capillaries 11. The output of the air controller leads through tube 34 to a bellows 35 in the downstream controller which replaces the spring 6, and adjustment 7, on the type of fluid pilot shown in Figs 1–4. The nozzle is, of course, inverted and the flapper 4 provided with an extension 37 as is necessary for downstream controllers. An adjusting nut 36 is provided to adjust the position of the bellows.

In operation, the knob 38 is set for a predetermined flow, the orifice 31 also being set to a suitable opening for such flow. The upstream controller is set for predetermined pressure which it maintains automatically in the manner described in connection with the controller in Figs. 1–4. The downstream controller is also set for a suitable range of flows. Fluid then flows through the upstream controller, restriction, flow meter and downstream controller. If the flow is greater than that set on the knob 38, the electrically actuated controller 33 will increase the fluid pressure in the tube 34 and will therefore cause the bellows 35 to expand slightly thus increasing the pressure on flapper 4. The flapper 4 will therefore move slightly down closing the gap between the nozzle 8 and the seat 37 which will increase the pressure in the tube 12 thereby constricting the tube 1 in the downstream control which will increase the back pressure and therefore cut down the flow through the restriction until the flow decreases to the point for which the knob 38 is set.

Let us assume that the viscosity of the liquid flow through the system increases, for example by an increase in the amount of suspended solids. The flow through the restriction will drop because the upstream and downstream pressure remain the same and the flow meter 32 will put out an electric current corresponding to a flow lower than that for which the knob 38 is set. The controller 33 will then decrease the fluid pressure in the tube 34 relaxing the bellows 35 and permitting the flapper 4 to rise slightly. This will move the seat 37 away from the nozzle decreasing the pressure in the tube 12 of the downstream controller which in turn will decrease the restriction on the tube 1 and will increase the flow through the system until a point is reached where the flow is just equal to that set by the knob 38.

It should be noted that the modification of Fig. 6 will maintain a constant flow regardless of pressure variations in the supply and delivery zones and regardless of changes in the viscosity of the fluid. A very accurate flow control can therefore be maintained.

The modification of Fig. 6 is shown with flapper valves of the sensitive type. This will give maximum sensitivity and performance of flow control but of course is subject to the limitations of this type of valve. The fluid pilot valve of the downstream controller may be replaced by the type shown in Fig. 5. (In general, the drawings are intended to illustrate various modifications. Different types of known fluid pilot controls may be used and it is an advantage of the invention that it is applicable to a wide range of control elements.)

The modification in Fig. 7 is suitable for usage where the liquid pressure is very high or where a toxic or otherwise dangerous liquid is being handled. Deformable, flexible conduits have definite limitations in that they are only useful with a moderate range of pressures and flexible conduits tend to wear out so that where hazardous liquids are used a certain amount of risk arises after long use.

The modification in Fig. 7 substitutes a strong metal pipe 40 within which is a deformable, flexible tube 1 divided into a series of compartments by the expander rings 39, 41, 42 and 43. The annular spaces between the deformable tube and the outer metal tube or sleeve is filled with a suitable liquid which is, of course, under the same pressure as the liquid inside of the flexible tube. The latter, therefore, is not subjected to any serious strain.

The annular space between the rings 39 to 41 communicates with a bellows 44 which in turn bears on the lower end of a bell crank 45. The loading on the bell crank is effected by a spring 7 and adjusting screw 6 in the same manner as the corresponding parts in Figs. 1 to 6. The other end of the bell crank 45 carries a seat 47 adjacent to the nozzle 46 of the air pilot valve which, as in the preceding figures, is supplied from an air pipe 10 through a capillary 11.

Variations in pressure in the tube 1 result in moving of the bell crank which varies the amount of air leaking through the nozzle 46 and hence the air pressure back of the nozzle. This latter is applied to a bellows 48 which is connected to the long end of a lever 49. The short end of the lever 49 actuates a rod 51 provided with pins 53. This rod connects two differential bellows 50 and 52, the former being connected to the annular space between expander rings 41 and 42, the latter to the annular space between rings 42 and 43.

In operation, the pressure of the spring 7 is adjusted for a certain pressure in the tube 1 and the nozzle 46 adjusted to its proper position. If the pressure in the tube 1 increases, the bellows 44 expands, moving the bell crank 45 and reducing or shutting off the flow of air from the nozzle 46. This results in pressure being built up in the bellows 48 which expands, compressing the bellows 50 through the lever 49 and rod 51. This latter forces liquid into the annular space between the rings 41 and 42, until sufficient throttling is effected so that the pressure in the conduit 1 is restored to its original predetermined figure. A drop in pressure results in the opposite effect, lowering the pressure in the bellows 48 and permitting the bellows 50 to expand. The bellows 52 is subjected to fluid pressure from the annular space between rings 42 and 43. This pressure is usually of the same order of magnitude as in the tube 1 downstream. As a result, the bellows 48 does not have to work against the full pressure in the conduit, but only a small differential pressure which permits the use of a lighter device and makes response more rapid. It is thus possible to control very much higher pressures than can be handled readily in the modifications shown in the Figs. 1 to 6.

I claim:

1. A device for controlling the pressure of a flowing fluid comprising in combination a conduit for said fluid provided with a section of resilient, deformable tubing, a fluid pressure responsive pilot valve including a separate source of fluid pressure and having an actuating element in contact with a section of said resilient tubing in a normal position in which the tubing is partially deformed, said fluid pilot having means for producing varying values of said separate pressure with changes in the degree of deformation of said tubing, and means for applying the varying fluid pressure of the pilot to deform a second section of said tubing.

2. A device according to claim 1 in which the pilot valve is of the flapper and nozzle type, and the pilot valve actuating element is the pressure-loaded flapper.

3. A device according to claim 2 in which the means for applying the fluid pressure of the pilot to deform said second section is a force multiplying element which is interposed between the controlled pressure of the pilot valve and the second deformable section of the fluid conduit.

4. A device according to claim 3 in which the force multiplying device comprises a large rigid surface only a portion of which is in contact with the second deformable section of the tubing, and the varying fluid pressure from the pilot valve is connected to a closed end deformable tube in contact with said rigid surface whereby changes in conduit fluid pressure cause the closed end tube to change its cross section to move the rigid surface.

5. A device according to claim 4 in which the surface is a plate which is hinged and provided with a projection bearing on the second resilient section of the fluid conduit and an arbor is rigidly fixed on the opposite side of said section and in registry with the projection whereby movement of the rigid plate results in a varying constriction of the resilient conduit section between the arbor and the projection.

6. A device for controlling the pressure of a flowing fluid comprising in combination a conduit for said fluid provided with a section of resilient, deformable tubing, a gas pilot valve of the flapper and nozzle type provided with an independent source of gas under pressure, the pressure-loaded flapper being in contact with said resilient tubing in a normal position in which the tubing is partially deformed, a second section of the tubing being in the form of a helix surrounding a rigidly mounted mandril, a plate and framework having guides thereon, the framework being rigidly connected to the mandril and the plate moving in said guides and contacting the turns of the helix, a rigid plate manually adjustable in said framework and spaced from the movable plate, a section of deformable tubing closed at one end between said movable plate and said adjustable plate, and means for connecting gas pressure from the pilot to said closed tube.

FRIDTJOF AAGAARD.

REFERENCES CITED

The following references are of record in the file of this patent:

UNITED STATES PATENTS

| Number | Name | Date |
|---|---|---|
| 726,962 | Metzger | May 5, 1903 |
| 1,120,002 | Walquist | Dec. 8, 1914 |
| 2,037,761 | Coe | Apr. 21, 1936 |
| 2,446,620 | Swallow | Aug. 10, 1948 |